(12) United States Patent
Inglis et al.

(10) Patent No.: US 7,395,530 B2
(45) Date of Patent: Jul. 1, 2008

(54) METHOD FOR IMPLEMENTING SINGLE THREADED OPTIMIZATIONS IN A POTENTIALLY MULTI-THREADED ENVIRONMENT

(75) Inventors: Derek B. Inglis, Markham (CA); Trent A. Gray-Donald, Ottawa (CA); Kevin A. Stoodley, Richmond Hill (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 10/930,032

(22) Filed: Aug. 30, 2004

(65) Prior Publication Data

US 2006/0048116 A1 Mar. 2, 2006

(51) Int. Cl.
*G06F 9/45* (2006.01)

(52) U.S. Cl. .................................................. 717/153

(58) Field of Classification Search ......... 717/141–146, 717/148, 151–161
See application file for complete search history.

(56) References Cited

U.S. PATENT DOCUMENTS

| | | | |
|---|---|---|---|
| 6,170,083 B1 | 1/2001 | Adl-Tabatabai | |
| 6,289,506 B1 | 9/2001 | Kwong et al. | |
| 6,330,714 B1* | 12/2001 | Hicks et al. | 717/131 |
| 6,341,371 B1 | 1/2002 | Tandri | |
| 6,505,344 B1* | 1/2003 | Blais et al. | 717/151 |
| 6,507,946 B2 | 1/2003 | Alexander, III et al. | |
| 6,530,079 B1 | 3/2003 | Choi et al. | |
| 6,665,865 B1 | 12/2003 | Ruf | |
| 6,757,891 B1* | 6/2004 | Azagury et al. | 717/158 |
| 2004/0221272 A1* | 11/2004 | Wu et al. | 717/128 |
| 2004/0250240 A1* | 12/2004 | Stoodley et al. | 717/116 |

OTHER PUBLICATIONS

Jeff Bogda and Urs Hölzle, "Removing Unnecessary Synchronization in Java", 1999, Proceedings of the 14th ACM SIGPLAN Conference on Objected-Oriented Programming, Systems, Languages, and Applications, United States, pp. 35-46.*

Fitzgerald et al., "Marmot: An Optimizing Compiler for Java", Mar. 2000, Software—Practice & Experience, vol. 30, Issue 3, pp. 199-232.*

Erik Ruf, "Effective Synchronization Removal for Java", 2000, Proceedings of the ACM SIGPLAN 2000 Conference on Programming Language Design and Implementation, pp. 208-218.*

Choi et al., "Stack Allocation and Synchronization Optimizations for Java Using Escape Analysis", Nov. 2003, ACM Transactions on Programming Languages and Systems, vol. 25, Issue 6, pp. 876-910.*

* cited by examiner

*Primary Examiner*—Meng-Ai An
*Assistant Examiner*—Jue Wang
(74) *Attorney, Agent, or Firm*—Matthew Talpis; Hoffman, Warnick & D'Alessandro LLC

(57) ABSTRACT

Under the present invention, program code is examined (statically or dynamically) for characteristics indicative of a potential to generate multiple threads. If none are found, single threaded optimization(s) such as desynchronization, optimization of globals, etc., can be implemented. In addition, if the program code is later revealed to have the potential to generate multiple threads, the single threaded optimization(s) can be corrected to avoid incorrect execution.

8 Claims, 2 Drawing Sheets

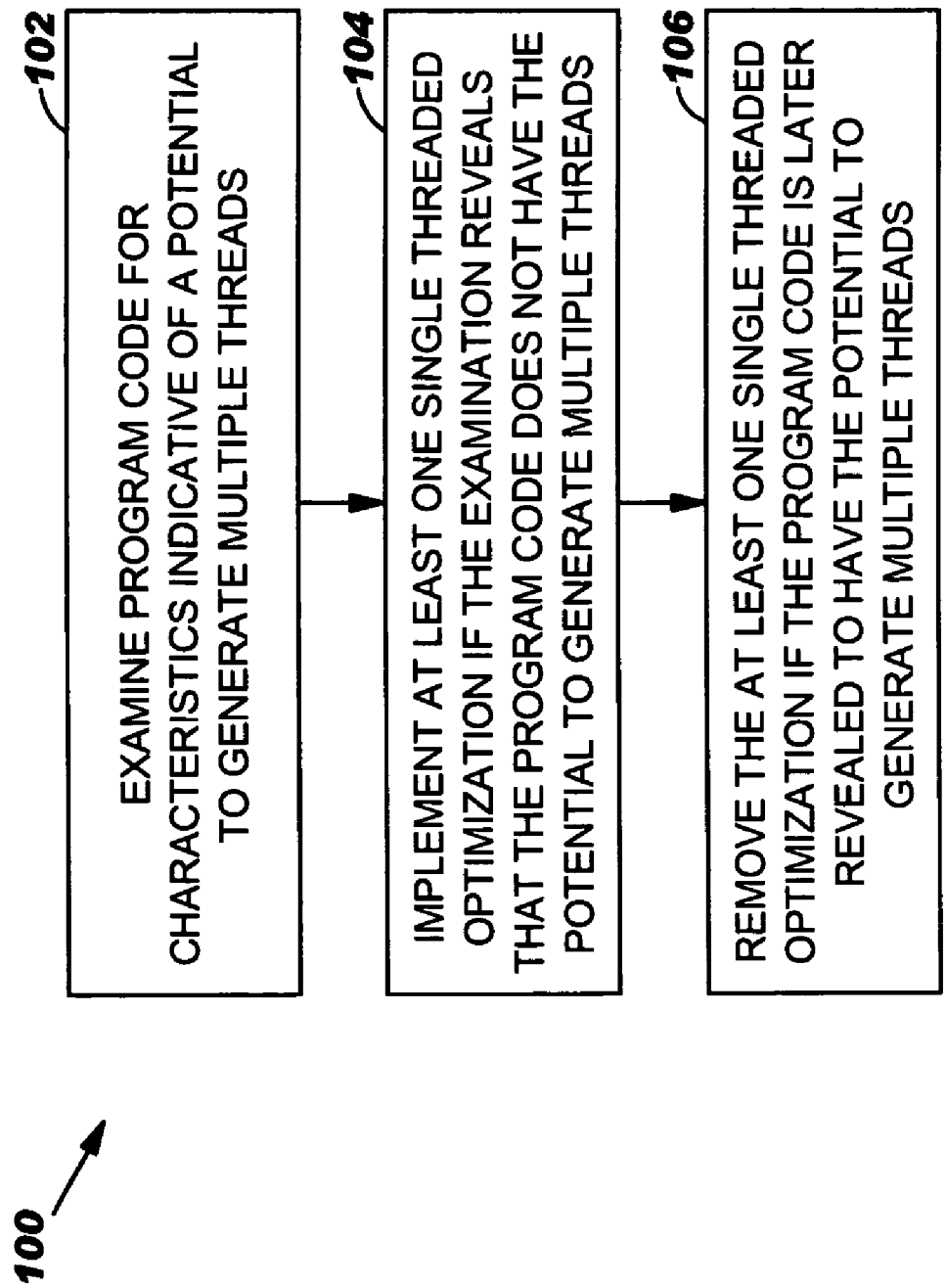

METHOD FOR IMPLEMENTING SINGLE THREADED OPTIMIZATIONS IN A POTENTIALLY MULTI-THREADED ENVIRONMENT

BACKGROUND OF THE INVENTION

1. Field of the Invention

The present invention generally relates to a method, system and program product for implementing single threaded optimizations in a potentially multi-threaded environment. Specifically, the present invention allows single threaded optimizations to be legally implemented in appropriate program code.

2. Related Art

As programming languages advance, computer programs can generally be categorized into groups that are capable of generating a single thread, and those that are capable of generating multiple threads. Based on this categorization, certain optimizations can be performed. For example, if a program is capable of only generating a single thread, the program can be desynchronized, its globals can be optimized, etc. Such single-threaded optimizations should not be implemented with programs having multi-thread capability at the risk of causing incorrect execution. To this extent, the possibility that multiple threads could be created by a program constrains analyses and restricts the code transformations that can be performed.

Most programming languages have a fixed set of primitives under which a new thread can be created. Unfortunately, no existing system provides the capability to examine a program for the potential to generate multiple threads without performing whole program analysis (i.e., seeing every piece of code that might be run), and then make optimizations based on the determination. This is an especially difficult task for dynamic loading environments where it is not possible to determine in advance if multiple threads cannot be generated. Specifically, in a dynamic compilation environment, examination results could change as the program continues to run/execute. To this extent, existing systems also fail to provide a system whereby an examination result and subsequent optimization that later proves to be erroneous can be reversed.

In view of the foregoing, there exists a need for a method, system and program product for implementing single threaded optimizations in a potentially multi-threaded environment. Specifically, a need exists for a system that is capable of examining (dynamically or statically) program code for multi-thread potential. A further need exists for the system to implement single threaded optimizations if the examination reveals that multi-thread potential is not present. Still yet, a need exists for the system to be able to take corrective steps in the event a program is later revealed to have multi-thread potential. This need is especially apparent in an environment with dynamic loading where it is not possible to determine in advance if multiple threads cannot be generated.

SUMMARY OF THE INVENTION

In general, the present invention provides a method, system and program product for implementing single threaded optimizations in a potentially multi-threaded environment. Specifically, under the present invention, program code is examined (statically or dynamically) for characteristics indicative of a potential to generate multiple threads. If none are found, single threaded optimization(s) such as desynchronization, optimization of globals, etc., can be implemented. In addition, if the program code is later revealed to have the potential to generate multiple threads, the single threaded optimization(s) can be corrected to avoid incorrect execution.

A first aspect of the present invention provides a method for implementing single threaded optimizations in a potentially multi-threaded environment, comprising: examining program code for characteristics indicative of a potential to generate multiple threads; and implementing at least one single threaded optimization if the examining step reveals that the program code does not have the potential to generate multiple threads, wherein the implementing step is correctible if the program code is later revealed to have the potential to generate multiple threads.

A second aspect of the present invention provides a method for implementing single threaded optimizations in a potentially multi-threaded environment, comprising: dynamically examining program code for characteristics indicative of a potential to generate multiple threads; implementing at least one single threaded optimization if the examining reveals that the program code does not have the potential to generate multiple threads; and removing the at least one single threaded optimization if the program code is later revealed to have the potential to generate multiple threads.

A third aspect of the present invention provides a system for implementing single threaded optimizations in a potentially multi-threaded environment, comprising: a code examination system for examining program code for characteristics indicative of a potential to generate multiple threads; an optimization system for implementing at least one single threaded optimization if the code examination system reveals that the program code does not have the potential to generate multiple threads; and a review system for removing the at least one single threaded optimization if the program code is later revealed to have the potential to generate multiple threads.

A fourth aspect of the present invention provides a program product stored on a recordable medium for implementing single threaded optimizations in a potentially multi-threaded environment, which when executed, comprises: means for examining program code for characteristics indicative of a potential to generate multiple threads; means for implementing at least one single threaded optimization if the means for examining reveals that the program code does not have the potential to generate multiple threads; and means for removing the at least one single threaded optimization if the program code is later revealed to have the potential to generate multiple threads.

A fifth aspect of the present invention provides a system for deploying an application for implementing single threaded optimizations in a potentially multi-threaded environment, comprising: a computer infrastructure being operable to: examine program code for characteristics indicative of a potential to generate multiple threads; implement at least one single threaded optimization if the means for examining reveals that the program code does not have the potential to generate multiple threads; and remove the at least one single threaded optimization if the program code is later revealed to have the potential to generate multiple threads.

A sixth aspect of the present invention provides computer software embodied in a propagated signal for implementing single threaded optimizations in a potentially multi-threaded environment, the computer software comprises instructions to cause a computer system to perform the following functions: examine program code for characteristics indicative of a potential to generate multiple threads; implement at least one single threaded optimization if the means for examining reveals that the program code does not have the potential to generate multiple threads; and remove the at least one single threaded optimization if the program code is later revealed to have the potential to generate multiple threads.

Therefore, the present invention provides a method, system and program product for implementing single threaded optimizations in a potentially multi-threaded environment.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a method flow diagram according to the present invention.

Figure 1:
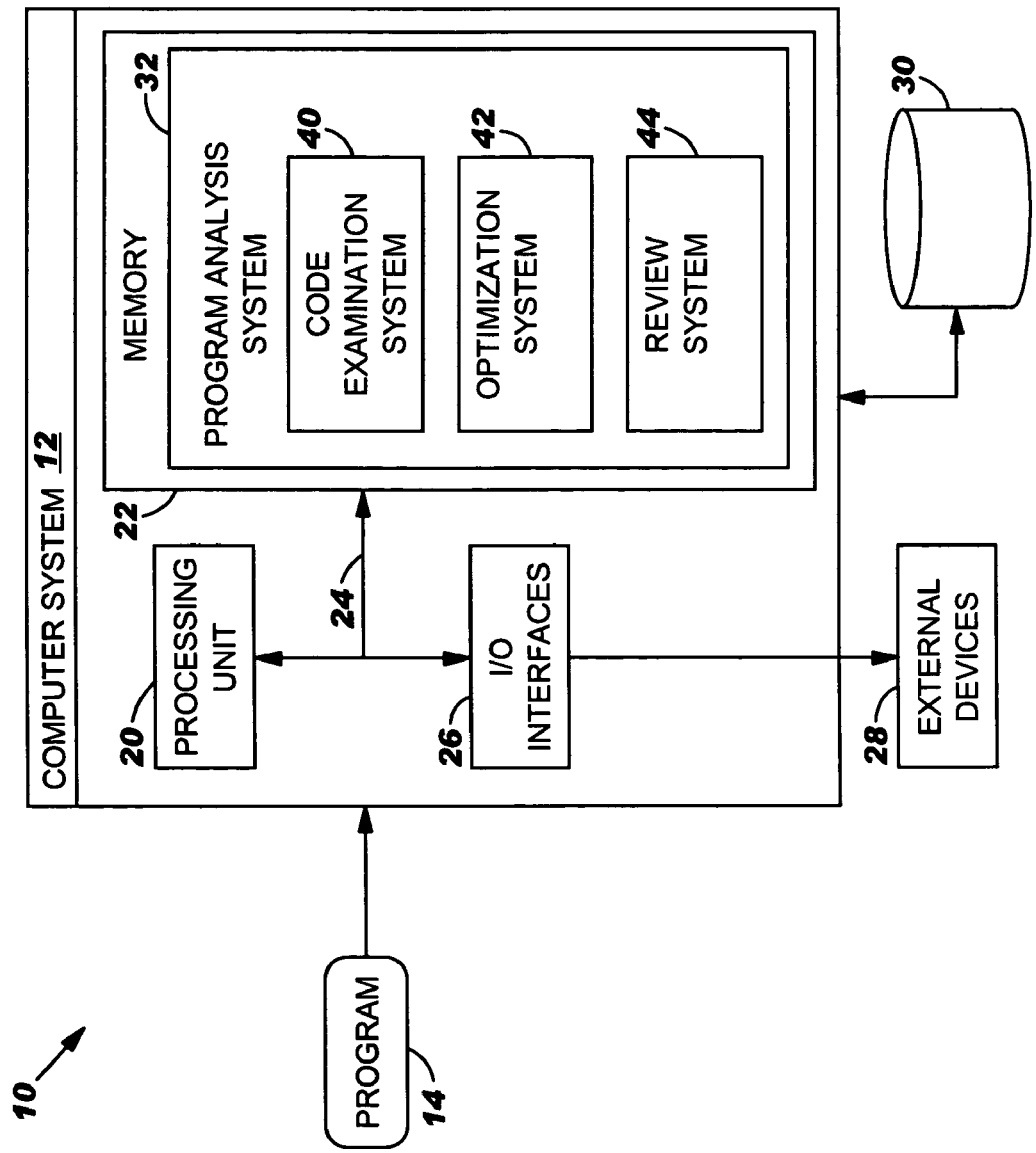
FIG. 1 depicts a system for implementing single threaded optimizations in a potentially multi-threaded environment according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DESCRIPTION OF THE INVENTION

As indicated above, the present invention provides a method, system and program product for implementing single threaded optimizations in a potentially multi-threaded environment. Specifically, under the present invention, program code is examined (statically or dynamically) for characteristics indicative of a potential to generate multiple threads. If none are found, single threaded optimization(s) such as desynchronization, optimization of globals, etc., can be implemented. In addition, if the program code is later revealed to have the potential to generate multiple threads, the single threaded optimization(s) can be corrected to avoid incorrect execution.

Referring now to FIG. 1, a system 10 for implementing single threaded optimizations in a potentially multi-threaded environment is shown. Under system 10, a computer system 12 will examine program 14 (i.e., the program code thereof) for characteristics indicative of a potential to generate multiple threads. If multi-thread potential is not found, then certain single threaded optimizations can be implemented. The examination of program 14 can occur statically before the program is run, or dynamically as the program is being run (e.g., compiled and run). To this extent, it should be understood that program analysis system 32 shown in memory 22 of computer system could be implemented as part of or in conjunction with a compiler, or a dynamic means such as a real-time compiler (e.g., a JAVA Just-in-Time Compiler, where JAVA is a trademark of Sun Microsystems, Inc. in the US and other countries). In any event performing the method of present invention dynamically allows the process to be "refined." Such refinement can come in the form of, for example, reducing the number of situations that prevent single threaded optimizations from being implemented and/or delaying correction of single threaded optimizations that have been implemented.

It should also be understood that in an illustrative example described below, the teachings of the present invention will be described in conjunction with the JAVA programming language (e.g., program 14 could be JAVA program). However, this need not be the case. Rather, the teachings herein could be implemented in conjunction with any programming language.

In addition, it should be appreciated that the present invention could be implemented via a stand-alone system as shown, or over a network such as the Internet, a local area network (LAN), a wide area network (WAN), a virtual private network (VPN), etc. Communication through such a network could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional IP-based protocol.

In any event, as depicted, computer system 12 generally processing unit 20, memory 22, bus 24, input/output (I/O) interfaces 26, external devices/resources 28 and storage unit 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to processing unit 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., a database, etc.) capable of providing storage for information under the present invention. Such information could include, among other things, characteristics indicative of a potential of program 14 to generate multiple threads, single threaded optimizations, an activity log, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 as a program product is program analysis system 32, which generally includes code examination system 40, optimization system, 42 and review system 44. Under the present invention, code examination system 40 will first examine the program code of program 14 for characteristics that are indicative of a potential of program 14 to generate multiple threads. Such characteristics could include, among other things, a new user thread being explicitly created in program 14; finalizer methods being run; and a native thread attaching to a (JAVA) process. Such characteristics could be programmed within code examination system 40 and/or accessed as a reference (e.g., in storage unit 30). Regardless, if the potential to generate multiple threads is not detected for program 14, optimization system 42 will implement one or more single threaded optimizations.

Under the present invention, many types of single threaded optimizations are possible. Two examples of such are as follows:

(1) Desynchronization: In multi-threaded programs, synchronization between threads is usually important to ensure correct execution. Most programming languages provide primitives to specify synchronized methods or synchronized blocks to enable programmers to indicate which sections of code and which objects require synchronization between threads to ensure correctness. It is common for classes to be designed and implemented generally enough to work correctly when used in a multi-threaded environment. In fact, many collection classes in the JAVA class library (e.g. Vector and Hashtable) contain a large number of synchronized methods because they are designed for general use. However, the convenient Application Programming Interfaces (APIs) offered by library classes means that they are frequently used by programmers in single-threaded programs as well, in which the case the synchronization is unnecessary, as contention is not possible. Since the lock/unlock operations required to implement synchronization are relatively expensive, eliminating such operations under the present invention can significantly improve the performance of a program proven to create only a single thread.

(2) Optimization of globals: The possibility that multiple threads can be created also hinders other optimizations, because it must be conservatively assumed that another thread could load another class or modify global data at any time (unless there is an explicit restriction imposed by the runtime to exclude this property). This means that traditional class hierarchy based optimizations like pre-existence cannot be naively applied for globals (fields/statics). Also, optimizations such as check elimination (e.g. null checks, array bound checks, zero divide checks) for globals also cannot be applied, as it is possible that another thread modifies the global after the check has been performed and before the code that depends on the check having been done earlier. To work around this problem when optimizing globals, compilers usually apply a specific transformation to privatize global accesses (i.e. read the global value into (thread-specific) locals that cannot be manipulated by another thread) before it can optimize them. Privatization of globals has drawbacks in that it adds compilation overhead, and also might not be possible in several, fairly common encountered situations.

After program 14 has been examined and subsequently optimized, the present invention also allows for correction in the event that program 14 is later determined to have the capability to generate multiple threads. This is especially useful when the present invention is implemented in a dynamic environment where the examination and optimization occur as program 14 is being run. Specifically, if an optimization is implemented that later needs to be reversed, the present invention will employ any means necessary (e.g., recompilation, code patching, any combination thereof, etc.) to affect the "de-implementation" of the single threaded optimization(s).

ILLUSTRATIVE EXAMPLE

For an illustrative example, assume that program 14 is a JAVA program. As indicated above, code examination system 40 will first dynamically examine the program code thereof for various characteristics that could indicate the potential of program 14 to generate multiple threads. Listed below are three non-exhaustive examples of characteristics for which program 14 could be examined:

(1) A new user thread is explicitly created: Program 14 could be examined to see if a new user thread is explicitly created that is reachable from an optimized method. Specifically, code examination system 40 will examine the relevant code that can affect the optimized region of program code within the method being optimized. The relevant code is defined to be any code that might be executed after the prologue and before an optimized region of code in the method. If there is a thread creation primitive (in JAVA language, this means allocation of any object whose type implements the interface such as "JAVA lang.Runnable"), an unresolved class in the relevant code, or call to an unsafe native, then the method will not be optimized. Unresolved accesses prevent optimization of the method because resolution can load a new class and invoke arbitrary JAVA code (which could create a new thread). A call to a native that is not recognized as a safe library method native will prevent the optimization of the method because the native may invoke code which could create a new thread.

The program code in methods that could possibly be invoked by calls in the relevant code is typically examined based on the class hierarchy of the program at compile time. For virtual calls, assumptions could be added such that if any method that could be invoked is overridden as a result of a future class loading event, and the method contains code that violates the single thread assumptions, the optimized method will be recompiled by review system 44. If it can be proven that a new user thread cannot be created in the relevant code, the method can be optimized by optimization system 42.

If it is later determined that an optimization was erroneously implemented, review system 44 will correct the error by recompilation. Recompilation alone is generally sufficient in this case because the examination of the present invention ensures that an optimized method cannot be on the "stack" when a method gets overridden or when a new class is loaded. Since the examination proves that there are no unresolved classes in the relevant code before optimizing a method, a class cannot be loaded from the relevant code.

(2) Finalizer methods are run: Program code in the finalizer method in each class that is loaded during program execution is examined to ensure that the method: (a) does not create a new thread; and (b) does not synchronize on any object the type of which could potentially be the same as the type of object(s) that were synchronized on in the optimized method. If either condition (a) or (b) is violated in any finalizer method, the potential to generate multiple threads is recognized and the corresponding method will not be optimized. However, if these conditions were satisfied, but were violated by some future class loading event, then the method is marked for recompilation. If an unresolved class was found in a finalizer method, the class will be registered in the compiler's internal data structures, so that if the class is loaded in future, the optimized method will be recompiled if the program code in relevant methods in that class violates assumptions.

It should be noted that recompilation by review system 44 alone might not be adequate to compensate for an assumption that gets violated in a finalizer method. If the optimized method was on the "stack" when a finalizer thread was running, the finalizer thread would be suspended until the method completes execution and returns. The JAVA specification does not strictly impose any conditions on when finalizers should be run and leaves it to the JVM to make that decision. Review system 44 can use code patching to add a call to notify the finalizer thread at all exit points out of the optimized method. An exception handler might need to be added around the whole method for this purpose in case the control exits out of the method as a result of an exception. This handler would notify the finalizer thread and then re-throw the original exception. An alternative way of achieving the same result is to patch (change) the return addresses to notify the finalizer thread upon a normal exit out of the method. If an exception is thrown, then the run time stack walker would need to notify the finalizer thread. Upon notification, the finalizer thread would resume executing. This would work well in most cases, but if the optimized method contained an infinite loop, then it might never exit, in which case, the finalizer thread would never resume. Thus, optimization system 42 will not optimize a method if the relevant code in it contains a loop that cannot be proven to terminate by analysis at compile time.

(3) Native thread attaching to a JAVA process: in this case, code examination system 40 will examine program 14 to see if a native thread is attached to a JAVA process. If so, the corresponding method should not be optimized. However, since a request for attaching a native thread might be received at any point in the execution of the program, recompilation is not sufficient in the event program 14 is erroneously optimized. Rather, review system 44 can implement code patching similar to described above for the finalizer thread case. The difference here would be that attachment of the native thread would be suspended until the method exits (similar to the suspension of the finalizer thread in the prior case), at which point a JAVA Virtual Machine (JVM) routine could be invoked to allow the attachment to occur. In this case as well, the presence of a potentially long running loop would prevent the optimization from being performed.

It should be appreciated that the teachings of the present invention could be offered as a business method on a subscription or fee basis. For example, computer system 12 of FIG. 1 could be created, maintained, supported and/or deployed by a service provider that offers the functions described herein for customers. That is, a service provider could offer to provide implementation of single threaded optimizations in a potentially multi-threaded environment as described above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 2, a method flow diagram 100 according to the present invention is shown. As depicted, first step 102 is to examine program code for characteristics indicative of a potential to generate multiple threads. Second step 104 is to implement at least one single threaded optimization if the examining reveals that the program code does not have the potential to generate multiple threads. Third step 106 is to remove the at least one single threaded optimization if the program code is later revealed to have the potential to generate multiple threads.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of program analysis system 32 of FIG. 1 is intended to be illustrative only.

We claim:

1. A method for implementing single threaded optimizations in a potentially multi-threaded environment, comprising:
    examining program code for characteristics indicative of a potential to generate multiple threads; wherein the examining is performed dynamically as the program code is running allowing the method to be refined; wherein the method is refined by at least one of reducing a number of situations that prevent single threaded optimizations from being implemented and delaying correction of single threaded optimizations that have been implemented; and
    implementing at least one single threaded optimization if the examining reveals that the program code does not have the potential to generate multiple threads, wherein the implementing is correctible if the program code is later revealed to have the potential to generate multiple threads.

2. The method of claim 1, wherein the examining is performed statically before the program is run.

3. The method of claim 1, wherein the examining comprises examining the program code for a thread creation primitive.

4. The method of claim 1, wherein the examining comprises examining a finalizer method in each class that is loaded by the program code for the potential to generate multiple threads.

5. The method of claim 1, wherein the examining comprises examining whether a native thread created by any process of the program code is attached to a JAVA process.

6. The method of claim 1, wherein the implementing comprises desynchronizing the program code if the examining reveals that the program code does not have the potential to generate multiple threads.

7. The method of claim 1, wherein the implementing comprises at least one of:
    optimizing globals for the program code if the examining reveals that the program code does not have the potential to generate multiple threads; and
    removing the at least one single threaded optimization if the examining is erroneous.

8. A method for implementing single threaded optimizations in a potentially multi-threaded environment, comprising:
    dynamically examining program code for characteristics indicative of a potential to generate multiple threads; wherein performing the examining dynamically allows the method to be refined; wherein the method is refined by at least one of reducing a number of situations that prevent single threaded optimizations from being implemented and delaying correction of single threaded optimizations that have been implemented;
    implementing at least one single threaded optimization if the dynamically examining step reveals that the program code does not have the potential to generate multiple threads; and
    removing the at least one single threaded optimization if the program code is later revealed to have the potential to generate multiple threads.

* * * * *